US012347237B2

United States Patent

(12) United States Patent
Kudo et al.

(10) Patent No.: US 12,347,237 B2
(45) Date of Patent: Jul. 1, 2025

(54) INFORMATION PROCESSING SYSTEM, INFORMATION PROCESSING METHOD AND RECORDING

(71) Applicant: NEC Corporation, Tokyo (JP)

(72) Inventors: Yuta Kudo, Tokyo (JP); Hiroshi Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/640,552

(22) PCT Filed: Apr. 30, 2021

(86) PCT No.: PCT/JP2021/017296

§ 371 (c)(1),
(2) Date: Nov. 3, 2022

(87) PCT Pub. No.: WO2022/230204

PCT Pub. Date: Nov. 3, 2022

(65) Prior Publication Data

US 2024/0046707 A1 Feb. 8, 2024

(51) Int. Cl.
*G06V 40/40* (2022.01)
*G06V 40/16* (2022.01)

(52) U.S. Cl.
CPC ............ *G06V 40/40* (2022.01); *G06V 40/173* (2022.01)

(58) Field of Classification Search
CPC ...... G06V 40/40; G06V 40/173; G06V 20/52; G06V 40/70; G06V 40/172; G06V 40/166; G06V 40/174; G06V 40/16; G06V 40/171; G06V 40/176; G06V 20/40; G06V 40/20; G06V 20/44; G06V 20/41; G06V 20/48; G06V 40/168; G06V 20/50; G06V 10/764;
(Continued)

(56) References Cited

U.S. PATENT DOCUMENTS

| | | | |
|---|---|---|---|
| 10,346,675 | B1 | 7/2019 | Nagalla |
| 2010/0157062 | A1 | 6/2010 | Baba et al. |

(Continued)

FOREIGN PATENT DOCUMENTS

| | | | |
|---|---|---|---|
| JP | 2007-140771 | A | 6/2007 |
| JP | 2010-044619 | A | 2/2010 |

(Continued)

OTHER PUBLICATIONS

International Search Report for PCT Application No. PCT/JP2021/017296, mailed on Jul. 20, 2021.

(Continued)

*Primary Examiner* — Nimesh Patel

(57) ABSTRACT

An information processing system (10) comprises: a storage means (110) for storing face information of a user and re-identification information used for re-identification of the user in association with each other; an acquiring means (120) for acquiring the face information and the re-identification information of a target user; a determining means (130) for performing determination whether or not the face information and the re-identification information of the target user are a pair stored in association with each other; and an output means (140) for outputting according to a result of the determination. According to the information processing system, it is possible to appropriately detect spoofing of a target user.

10 Claims, 16 Drawing Sheets

(58) Field of Classification Search

CPC ........ G06V 20/46; G06V 10/82; G06V 40/45; G06V 40/23; G06V 20/64; G06V 40/197; G06V 20/58; G06V 40/1365; G06V 40/15; G06V 40/18; G06V 40/25; G06V 40/28; G06F 21/32; G06F 3/017; G06F 2203/011; G06F 3/013; G06F 18/22; G06F 3/012; G06F 3/16; G06F 1/1605; G06F 16/436; G10L 15/08; G10L 15/25; G10L 2015/088; G10L 15/20; G10L 13/00; G10L 17/04; G10L 17/10; G10L 15/16; G10L 17/18; G10L 25/63; G10L 17/00; G10L 15/02; G10L 17/06; G10L 25/51; G10L 2015/221; G10L 25/78; G10L 15/18; H04L 63/0861; H04L 9/3231; H04L 51/10; H04L 9/0866; H04L 63/1416; H04L 51/046; H04L 9/40; H04L 63/08; H04L 67/535; G06N 3/045; G06N 20/00; G06N 20/10; G06N 3/048; G06N 3/08; G06N 5/022; G06N 3/04; G06T 7/70; G06T 2207/20081; G06T 2207/10016; G06T 2207/20084; G06T 7/0014; G06T 7/20; G06T 13/40; G06T 13/80; G06T 17/05; G06T 17/00; G06T 2200/24; G06T 1/0007; G06T 15/00; G06T 19/00; G06T 19/003; G06T 7/0012; G06T 7/246; G06T 7/292; G07C 9/37; G07C 1/10; G07C 9/38; G07C 9/00563; G07C 9/25; G07C 9/27; G07C 9/00571

See application file for complete search history.

(56) References Cited

U.S. PATENT DOCUMENTS

2010/0158327 A1* 6/2010 Kangas .................. G06F 21/32 382/124
2016/0292536 A1* 10/2016 Irie ..................... G06V 40/172
2017/0063852 A1* 3/2017 Azar ..................... G06V 40/70
2019/0050546 A1* 2/2019 Hochrieser ........... G06V 40/16
2019/0311104 A1 10/2019 Maeno et al.
2019/0311261 A1* 10/2019 Baldwin ................. G06N 3/08
2020/0159908 A1* 5/2020 Okuyama .............. G06F 21/45
2020/0364444 A1 11/2020 Kaneoka et al.
2021/0406567 A1 12/2021 Shibata et al.

FOREIGN PATENT DOCUMENTS

| | | | |
|---|---|---|---|
| JP | 2010-154134 | A | 7/2010 |
| JP | 2012-083997 | A | 4/2012 |
| JP | 2015-041307 | A | 3/2015 |
| JP | 2019-049786 | A | 3/2019 |
| JP | 2020-086780 | A | 6/2020 |
| JP | 2020-187543 | A | 11/2020 |
| WO | 2018/110012 | A1 | 6/2018 |
| WO | 2020/065954 | A1 | 4/2020 |

OTHER PUBLICATIONS

Daigo Muramatsu et al., "Person Authentication Using Multiple Features Extracted from a Single Walking Video", The IEICE Transactions A, Dec. 1, 2014, pp. 735-748.

JP Office Action for JP Application No. 2023-517026, mailed on Oct. 1, 2024 with English Translation.

Extended European Search Report for EP Application No. 21939360.0, dated on May 24, 2024.

* cited by examiner

FIG. 7

| Type of re-identification information | Acquisition example |
|---|---|
| Body shape | Acquiring from an image of a user |
| Clothes | |
| Gait | |
| Property | |
| Attendant | |
| Voice | Acquiring from a microphone |
| Terminal information | Acquiring from a terminal of a user |

INFORMATION PROCESSING SYSTEM, INFORMATION PROCESSING METHOD AND RECORDING

This application is a National Stage Entry of PCT/JP2021/017296 filed on Apr. 30, 2021, the contents of all of which are incorporated herein by reference, in their entirety.

TECHNICAL FIELD

This disclosure relates to the technical field of an information processing system, an information processing method and a recording medium that processing information such as face information.

BACKGROUND ART

As this type of system, a system performing face authentication (i.e., verification of face information) using face information is known. For example, Patent Literature 1 discloses that the face information used for face verification and identification information such as the ID of a person are registered in association with each other and used during verification. Patent Literature 2 discloses narrowing face images of target, that will be matched with a face image of an authentication target, by stepwise determining features other than a face before performing face authentication.

As another related art, Patent Literature 3 discloses performing a spoofing determination by detecting a human-like operation. Patent Literature 4 discloses detecting spoofing by recognizing that color or the like of clothes of a person has changed.

CITED LIST

Patent Literature

Patent Literature 1: International Publication No. 2018/110012

Patent Literature 2: Japanese Patent Application Laid Open No. 2020-187543

Patent Literature 3: Japanese Patent Application Laid Open No. 2015-041307

Patent Literature 4: Japanese Patent Application Laid Open No. 2010-154134

SUMMARY

Technical Problem

This disclosure aims to improve the techniques disclosed in prior art literatures.

Solution to Problem

One aspect of an information processing system of this disclosure comprises: a storage means for storing face information of a user and re-identification information used for re-identification of the user in association with each other; an acquiring means for acquiring the face information and the re-identification information of a target user; a determining means for performing determination whether or not the face information and the re-identification information of the target user are a pair stored in association with each other; and an output means for outputting according to a result of the determination.

One aspect of an information processing method of this disclosure comprises: storing face information of user and re-identification information used for re-identification of the user in association with each other; acquiring the face information and the re-identification information of a target user; performing determination that whether or not the face information and the re-identification information of the target user are a pair stored in association with each other; and performing output according to a result of the determination.

One aspect of a recording medium of this disclosure on which a computer program for causing a computer to execute an information processing method comprising: storing face information of user and re-identification information used for re-identification of the user in association with each other; acquiring the face information and the re-identification information of a target user; performing determination that whether or not the face information and the re-identification information of the target user are a pair stored in association with each other; and performing output according to a result of the determination is recorded.

BRIEF DESCRIPTION OF DRAWINGS

FIG. 7 is a table showing a specific example of re-identification information used by an information processing system according to a fourth embodiment.

DESCRIPTION OF EMBODIMENTS

Figure 1:
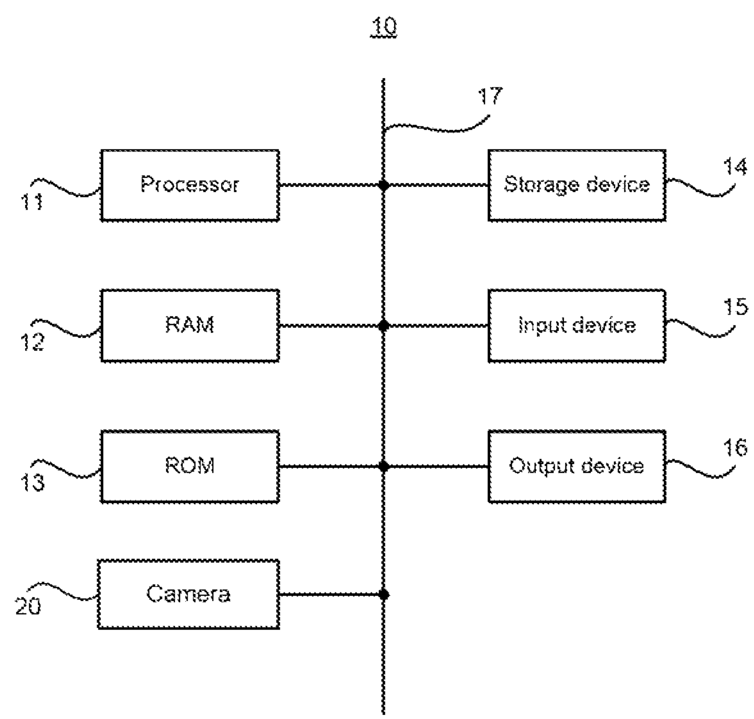
FIG. 1 is a block diagram showing a hardware configuration of an information processing system according to a first embodiment.

Hereinafter, embodiments of an information processing system, an information processing method and a recording medium will be described referring to the drawings.

First Embodiment

An information processing system according to a first embodiment will be described referring to FIGS. 1 to 3.

(Hardware Configuration)

First, a hardware configuration of the information processing system 10 according to the first embodiment will be described referring to FIG. 1. FIG. 1 is a block diagram showing the hardware configuration of the information processing system according to the first embodiment.

As illustrated in FIG. 1, the information processing system 10 according to the first embodiment includes a processor 11, a RAM (Random Access Memory) 12, a ROM (Read Only Memory) 13 and a storage device 14. The information processing system 10 may further include an input device 15, an output device 16 and a camera 20. The processor 11, the RAM 12, the ROM 13, the storage device 14, the input device 15, the output device 16 and the camera 20 are connected via a data bus 17.

The processor 11 reads computer programs. For example, the processor 11 is configured to read a computer program stored in at least one of the RAM 12, the ROM 13 and the storage device 14. Alternatively, the processor 11 may read a computer program stored in a computer-readable recording medium using a recording medium reading apparatus (not shown). The processor 11 may acquire (i.e., read) a computer program from an apparatus (not shown) located outside the information processing system 10 via a network interface. The processor 11 controls the RAM 12, the storage device 14, the input device 15 and the output device 16 by executing the read computer program. In particular, in the present embodiment, when the computer program read by the processor 11 is executed, a function block for executing processing using the face information is implemented in the processor 11.

The processor 11 may be configured as, for example, a CPU (Central Processing Unit), a GPU (Graphics Processing Unit), a FPGA (field-programmable gate array), a DSP (Demand-Side Platform) and a ASIC (Application Specific Integrated Circuit. The processor 11 may be configured in one of these, or may be configured to use a plurality in parallel.

The RAM 12 temporarily stores computer programs executed by the processor 11. The RAM 12 temporarily stores data for use by the processor 11 when the processor 11 is executing a computer program. The RAM 12 may be, for example, D-RAM (Dynamic RAM).

The ROM 13 stores computer programs executed by the processor 11. The ROM 13 may otherwise store fixed data. The ROM 13 may be, for example, P-ROM (Programmable ROM).

The storage device 14 stores data that the information processing system 10 stores for a long period of time. The storage device 14 may operate as a temporary storage device of the processor 11. The storage device 14 may include, for example, at least one of a hard disk apparatus, a magneto-optical disk apparatus, an SSD (Solid State Drive), and a disk array apparatus.

The input device 15 is a device that receives input instructions from a user of the information processing system 10. The input device 15 may include, for example, at least one of a keyboard, a mouse and a touch panel.

The output device 16 is a device for outputting information relating to the information processing system 10 to the outside. For example, the output device 16 may be a display apparatus (e.g., a display) capable of displaying information about the information processing system 10.

The camera 20 is a camera installed in a position capable of capturing an image of a user (in particular, an image including a face of the user). The camera 20 may be a camera for capturing a still image or a camera for capturing a moving image. The camera may be configured as a visible light camera or as a near infrared camera. The cameras 20 may be a plurality of installed cameras, each of which may be of different specifications. If multiple cameras 20 are installed, they may be arranged in different locations, respectively.

(Functional Configuration)

Next, a functional configuration of the information processing system 10 according to the first embodiment will be described referring to FIG. 2. FIG. 2 is a block diagram showing a functional configuration of the information processing system according to the first embodiment.

Figure 2:
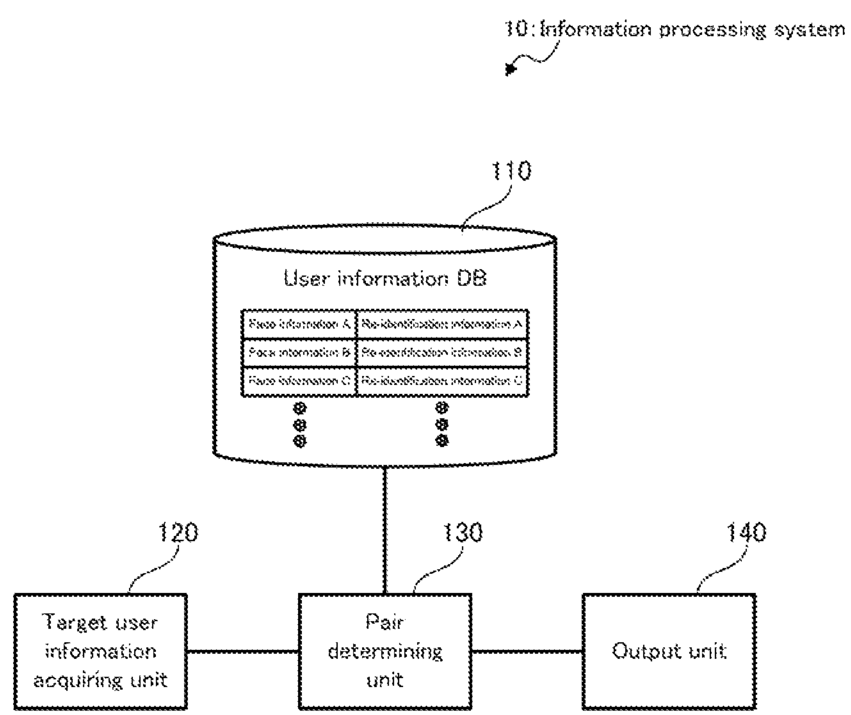
FIG. 2 is a block diagram showing a functional configuration of the information processing system according to the first embodiment.

As shown in FIG. 2, the information processing system 10 according to the first embodiment includes a user information database 110, a target user information acquiring unit 120, a pair determining unit 130 and an output unit 140 as processing blocks for realizing the functions thereof. The user information database 110 may be configured to include, for example, the storage device 14 described above (see FIG. 1). The target user information acquiring unit 120, the pair determining unit 130 and the output unit 140 may be implemented by, for example, the above-described processor 11 (see FIG. 1). The output unit 140 may be configured to output the output by the output device 16 (see FIG. 1).

The user information database 110 is configured to be capable of storing information about a plurality of users acquired in advance. The user information database 110 is configured to be able to store face information of a user and re-identification information used for re-identification of the user in association with each other (i.e., in a pair). For example, as shown in the figure, face information and re-identification information of a user A may be stored as a pair of a face information A and a re-identification information A. Similarly, face information and re-identification information of a user B may be stored as a pair of a face information B and a re-identification information B. Face information and re-identification information of a user C may be stored as a pair of a face information C and a re-identification information C. Incidentally, the "face information" here is information relating to a face of a user, and may be, for example, a face image itself, or may be a feature amount indicating a feature of a face extracted from a face image. Further, the "re-identification information" is information that can determine whether or not the user is the same person, and is different from the face information (for example, information acquired from other than the face). Specific examples of the re-identification information will be described in detail in other embodiments described later.

The target user information acquiring unit 120 is configured to acquire the face information and the re-identification information from the target user to be determined. The target user information acquiring unit 120 may be configured to acquire face information and re-identification information from an image of the target user captured by the camera 20, for example. In this case, the target user information acquiring unit 120 may have a function of extracting face information and re-identification information by performing various analysis processing on an image of the target user. Face information and re-identification information may be acquired from a common single image or may be acquired from separate images, respectively. However, the target user information acquiring unit 120 may be configured to acquire face information and re-identification information using means other than the camera 20.

The pair determining unit 130 is configured to be able to determine whether or not face information and re-identification information of the target user are paired and stored in association with each other. Specifically, the pair determining unit 130 determines whether or not each of the face information and the re-identification information acquired by the target user information acquiring unit 120 matches the face information and the re-identification information in association with each other (i.e., the face information and the re-identification information of the pair) stored in the user information database 110. It may be determined that whether or not the face information and the re-identification information match each other by using, for example, a preset threshold value or the like. Specifically, the pair determining unit 130 may determine that the degree of coincidence (similarity) of the face information and the re-identification information are matched when the degree of coincidence (similarity) exceeds the threshold value, and may determine that those are not matched when the degree of coincidence does not exceed the threshold value.

The output unit 140 performs output according to the determination result of the pair determining unit 130. The output unit 140 may output the determination result of the pair determining unit 130 as it is, or may output the result of another processing to be executed in accordance with the determination result of the pair determining unit 130. The output mode of the output unit 140 is not particularly limited, the output unit 140 may perform image output using, for example, a display. Alternatively, the output unit 140 may perform audio output using a speaker.

(Flow of Operation)

Next, referring to FIG. 3, flow of operation of the information processing system according to the first embodiment will be described. FIG. 3 is a flowchart showing the flow of the operation of the information processing system according to the first embodiment.

Figure 3:
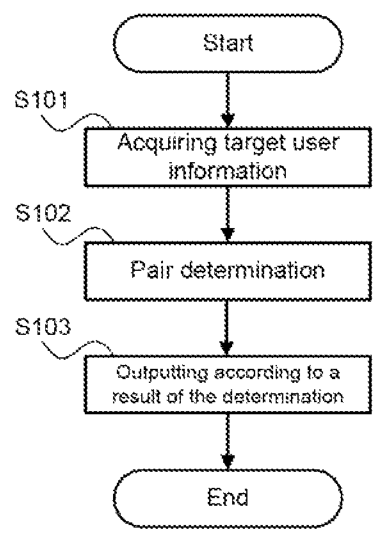
FIG. 3 is a flowchart showing flow of operation of the information processing system according to the first embodiment.

As shown in FIG. 3, when the information processing system 10 according to the first embodiment operates, first, the target user information acquiring unit 120 acquires face information and re-identification information from the target user (step S101). The target user information acquiring unit 120 may acquire the re-identification information after acquiring the face information, or may acquire the face information after acquiring the re-identification information. Alternatively, the target user information acquiring unit 120 may simultaneously acquire face information and re-identification information in parallel.

Subsequently, the pair determining unit 130 determines whether or not the face information and the re-identification information acquired by the target user information acquiring unit 120 are a pair (hereinafter, appropriately referred to as "correct pair") of face information and re-identification information in association with each other stored in the user information database 110 (step S102). Note that a specific flow of this determination processing will be described in detail in other embodiments described later. Thereafter, the output unit 140 performs output according to the determination result of the pair determining unit 130 (step S103).

(Technical Effects)

Next, technical effects obtained by the information processing system 10 according to the first embodiment will be described.

As described referring to FIGS. 1 to 3, in the information processing system 10 according to the first embodiment, it is determined whether or not the face information and the re-identification information of the target user are a correct pair (i.e., a pair stored in advance), and an output corresponding to the determination result is performed. In this way, spoofing of the target user can be detected.

For example, if a malicious user attempts to break through an authentication processing by spoofing, he/her should make a system recognize a face of other person in some way (e.g., by presenting a terminal displaying a face image, or by wearing a 3D mask). In such a case, the face information of the target user changes before and after spoofing, but the re-identification information acquired from other than the face does not change. Therefore, the pair of face information and re-identification information stored before spoofing does not match the pair of face information and re-identification information after spoofing. Therefore, if the face information and the re-identification information of the target user are not the correct pair, it can be determined that there is a high probability that the target user is spoofing.

Second Embodiment

An information processing system 10 according to a second embodiment will be described referring to FIG. 4. The second embodiment is only different from the first embodiment described above in a part of operation, and may be the same as the first embodiment in other portions. Therefore, the portions that differ from the first embodiment described above will be described in detail below, and the overlapping portions will not be appropriately explained.

(Flow of Operation)

First, referring to FIG. 4, flow of operation of the information processing system according to the second embodiment will be described. FIG. 4 is a flowchart showing the flow of the operation of the information processing system according to the second embodiment. Incidentally, in FIG. 4, the same reference numerals are given to the same processing as shown in FIG. 3.

Figure 4:
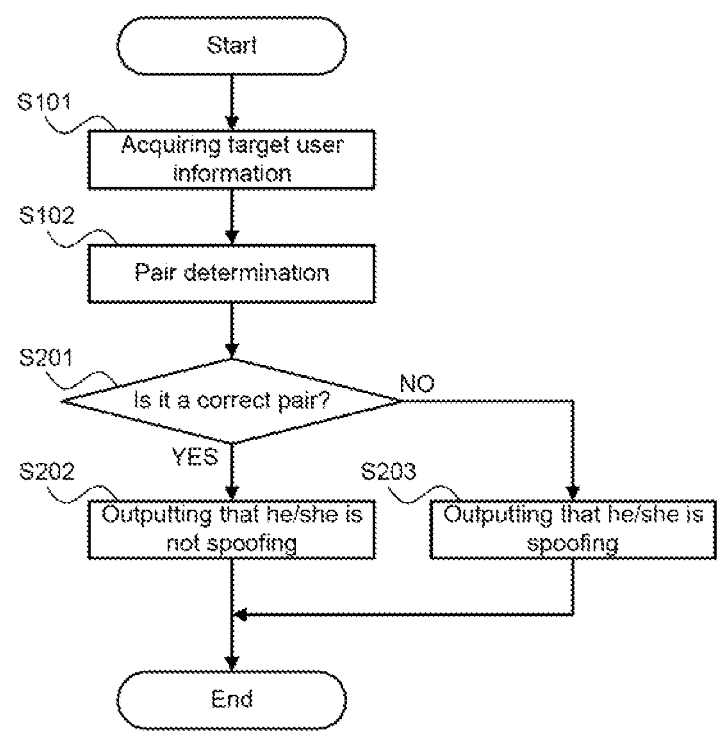
FIG. 4 is a flowchart showing flow of operation of an information processing system according to a second embodiment.

As shown in FIG. 4, when the information processing system 10 according to the second embodiment operates, first, the target user information acquiring unit 120 acquires face information and re-identification information from the target user (step S101). The pair determining unit 130 determines whether or not the face information and the re-identification information acquired by the target user information acquiring unit 120 are a pair of face information and re-identification information in association with each other stored in the user information database 110 (step S102).

Subsequently, when it is determined that face information and re-identification information of the target user are the correct pair (step S201: YES), the pair determining unit 130 outputs the result when the target user has not spoofed (step S202). On the other hand, when it is determined that the face information and the re-identification information of the target user are not the correct pair (step S201: NO), the pair determining unit 130 outputs the result when the target user is spoofing (step S203).

Note that the output here may be output as an alert indicating that the target user is spoofing (that is, fraud has been performed). Specifically, an alarm display indicating the occurrence of spoofing may be performed, or an alarm sound may be output. The output of the output unit 140 is not output to the target user, it may be output only to the system manager or guard.

(Technical Effects)

Next, technical effects obtained by the information processing system 10 according to the second embodiment will be described.

As described referring to FIG. 4, in the information processing system 10 according to the second embodiment, when it is determined that the face information and the re-identification information of the target user are not the correct pair, information that notifies that the spoofing is performed is output. In this way, it is possible to appropriately determine the spoofing of the target user and promptly notify the target to be informed of the occurrence of spoofing.

Third Embodiment

An information processing system 10 according to a third embodiment will be described referring to FIGS. 5 and 6. Incidentally, the third embodiment is only different from the first and the second embodiments described above in a part of a configuration and operation, and may be the same as the first and the second embodiments in other portions. Therefore, the portions that differ from the embodiments described above will be described in detail below, and other overlapping portions will not be appropriately described.

(Functional Configuration)

First, referring to FIG. 5, a functional configuration of the information processing system 10 according to the third embodiment will be described. FIG. 5 is a block diagram showing the functional configuration of the information processing system according to the third embodiment. Incidentally, in FIG. 5, it is denoted by the same reference numerals to the same elements as the components shown in FIG. 2.

Figure 5:
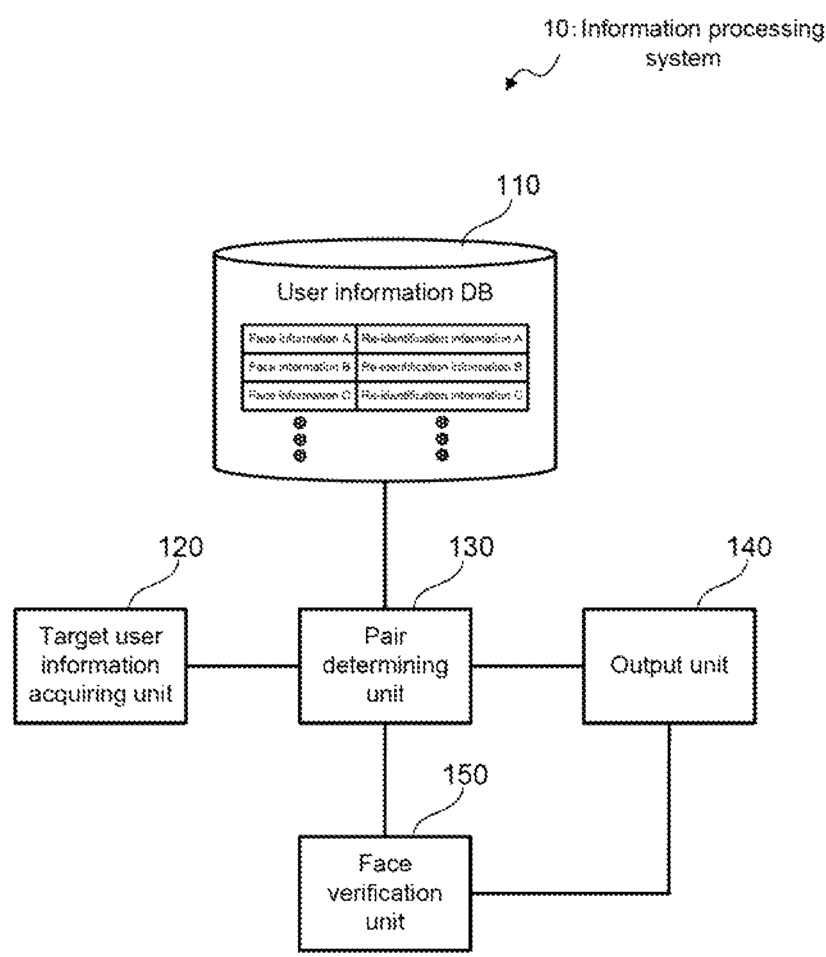
FIG. 5 is a block diagram showing a functional configuration of an information processing system according to a third embodiment.

As shown in FIG. 5, the information processing system 10 according to the third embodiment is configured to include a user information database 110, a target user information acquiring unit 120, a pair determining unit 130, an output unit 140 and a face verification unit 150 as processing blocks for realizing the functions. That is, the information processing system 10 according to the third embodiment further includes the face verification unit 150 in addition to the configuration of the first embodiment (see FIG. 2).

The face verification unit 150 is configured to be capable of performing face matching (in other words, face authentication) of the target user using the face information acquired by the target user information acquiring unit 120. Incidentally, as for the specific method of face verification, since the existing technology can be appropriately adopted, a detailed description thereof will be omitted here. In particular, the face verification unit 150 according to the present embodiment is configured to perform face verification when it is determined that the face information and the re-identification information of the target user are the correct pair by the pair determining unit 130. The verification result of the face verification unit 150 is configured to be output by the output unit 140.

Incidentally, the face verification described above may be performed for authenticating that whether or not the target user is a person, who is registered as a user. For example, a user with successful face verification may be permitted to path through a gate, at which only a registered use can path through. Alternatively, the user with successful face verification may be permitted to execute a settlement processing using a settlement method associated with a registered user.

(Flow of Operation)

Next, referring to FIG. 6, flow of operation of the information processing system according to the third embodiment will be described. FIG. 6 is a flowchart showing the flow of the operation of the information processing system according to the third embodiment. Incidentally, in FIG. 6, the same reference numerals are given to the same processing as shown in FIGS. 3 and 4.

Figure 6:
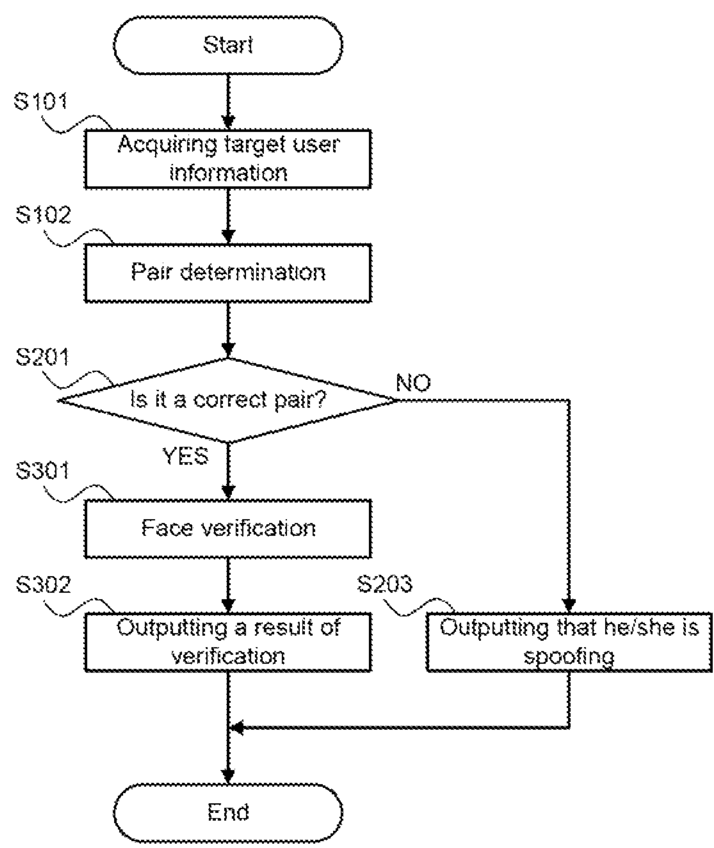
FIG. 6 is a flowchart showing flow of operation of the information processing system according to the third embodiment.

As shown in FIG. 6, when the information processing system 10 according to the third embodiment operates, first, the target user information acquiring unit 120 acquires face information and re-identification information from the target user (step S101). The pair determining unit 130 determines whether or not the face information and the re-identification information acquired by the target user information acquiring unit 120 are the stored correct pair in association with the user information database 110 (step S102).

Subsequently, when it is determined that the face information and the re-identification information of the target user are not the correct pair (step S201: NO), the pair determining unit 130 outputs the result when the target user is spoofing (step S203). On the other hand, when it is determined that the face information and the re-identification information of the target user are the correct pair (Step S201: YES), the pair determining unit 130 executes face verification of the target user (Step S301). The output unit 140 outputs the result of face verification by the face verification unit 150 (step S302). In addition to the result of the face verification, the output unit 140 may output that the target user has not made impersonation (second embodiment: see FIG. 4).

(Technical Effects)

Next, technical effects obtained by the information processing system 10 according to the third embodiment will be described.

As described referring to FIGS. 5 and 6, in the information processing system 10 according to the third embodiment, when it is determined that the face information and the re-identification information of the target user are the correct pair, face verification is performed and the result is output. In this way, when it can be determined that the target user is not spoofing, face verification is performed, so that face verification is not performed for the target user performing spoofing. Therefore, it is possible to prevent the targeted user performing the impersonation from fraudulently breaking the face matching.

Fourth Embodiment

An information processing system 10 according to a fourth embodiment will be described referring to FIG. 7. The fourth embodiment is an embodiment, which describes a specific example of re-identification information, and may be the same as the first to the tired embodiments in configurations and operations. Therefore, in the following, the portions overlapping with the embodiments already described are not described as appropriate.

(Specific Example of Re-Identification Information)

Referring to FIG. 7, re-identification information used in the information processing system 10 according to the fourth embodiment will be described. FIG. 7 is a table showing a specific example of re-identification information used by the information processing system according to the fourth embodiment.

As shown in FIG. 7, the re-identification information used by the information processing system 10 according to the fourth embodiment may be a body shape, clothes, a gait, a property, an attendant and voice of a user, and terminal information (i.e., information obtained from a thing owned by the user). The re-identification information may include only one of these plurality of types of information, or may include a plurality.

When the re-identification information includes a body shape, clothes, a gait, a property or an attendant, those information may be acquired, for example, from an image of a user. Incidentally, as for the method of acquiring information about the body shape, clothes, the gait, the property, or the attendant from the image of the user, it is possible to appropriately adopt the existing technology.

Also, when the re-identification information includes voice of the user, the information may be obtained from the microphone. When the re-identification information is the terminal information, the information may be acquired by wireless communication with a terminal or the like of the user. It is preferable that the terminal information is not such that it is acquired when the user holds the terminal at a predetermined position, but is such that it is automatically acquired without the user's operation.

(Technical Effects)

Next, technical effects obtained by the information processing system 10 according to the fourth embodiment well be described.

As described referring to FIG. 7, in the information processing system 10 according to the fourth embodiment, at least one or more of the body shape, clothes, the gait, the property, the attendant and voice of the user, and information that can be obtained from a thing owned by the user is used as the re-identification information. In this way, it is possible to properly detect spoofing of the target user by determining whether or not the face information and the re-identification information are the correct pair.

Fifth Embodiment

An information processing system 10 according to a fifth embodiment will be described referring to FIG. 8. Incidentally, the fifth embodiment is only different from the first to the fourth embodiment described above in a part of configuration, and may be the same as the first to fourth embodiments in the other portions. Therefore, the portions that differ from the embodiments described above will be described in detail below, and the other overlapping portions will not be described as appropriate.

(Functional Configuration)

First, a functional configuration of the information processing system 10 according to the fifth embodiment will be described referring to FIG. 8. FIG. 8 is a block diagram showing the functional configuration of the information processing system according to the fifth embodiment. Incidentally, in FIG. 8, it is denoted by the same reference numerals to the same elements as the components shown in FIG. 2.

Figure 8:
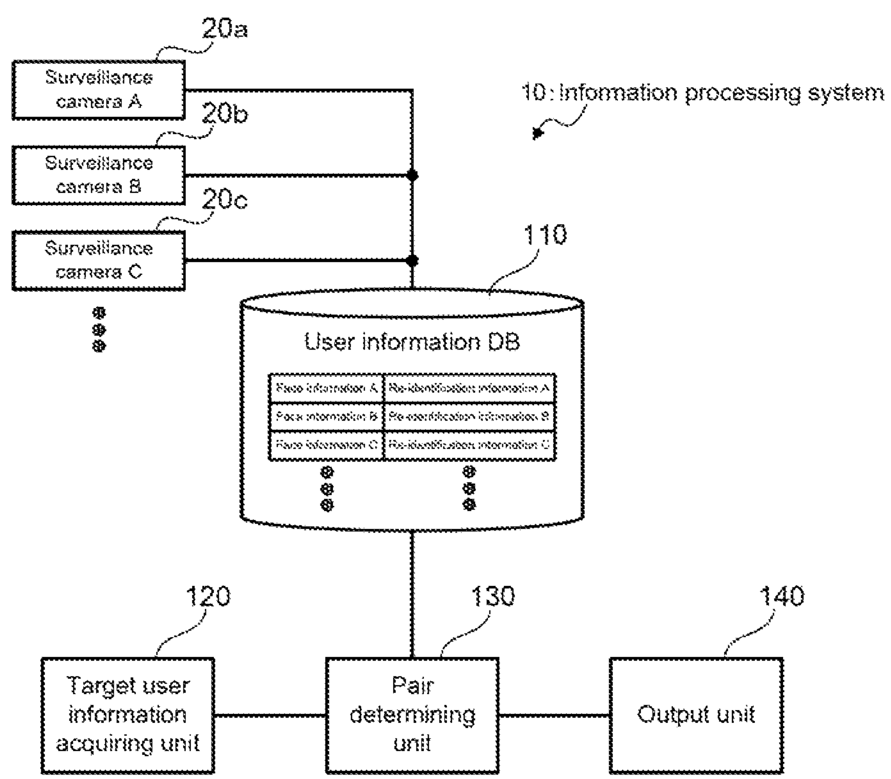
FIG. 8 is a block diagram showing a functional configuration of an information processing system according to a fifth embodiment.

As shown in FIG. 8, the information processing system 10 according to the fifth embodiment is configured to include a user information database 110, a target user information acquiring unit 120, a pair determining unit 130 and an output unit 140 as processing blocks for realizing the functions. Then, the user information database 110 according to the fifth embodiment, in particular, from the image captured by the plurality of cameras 20 (monitoring cameras 20*a*, 20*b*, and 20*c*), and is configured to be capable of storing by acquiring the face information and the re-identification information of the user. Although the three monitoring cameras 20*a*, 20*b*, and 20*c* are illustrated here for convenience of explanation, more monitoring cameras may be used to acquire user face information and re-identification information Surveillance cameras 20*a*, 20*b* and 20*c* are cameras installed in different locations, respectively. Therefore, the user information database 110 can acquire and store the face information and the re-identification information at a plurality of locations. Further, the monitoring cameras 20*a*, 20*b* and 20*c*, it is possible to capture an image of the user from a separate angle, respectively. Therefore, if the monitoring cameras 20*a*, 20*b*, and 20*c* are used, the face information and the re-identification information can be obtained from the user image captured from an appropriate angle. Further, the monitoring cameras 20*a*, 20*b* and 20*c*, it is possible to capture an image of the user at different timings, respectively. Therefore, if the monitoring cameras 20*a*, 20*b* and 20*c* are used, the face information and the re-identification information can be obtained from the user image captured at an appropriate timing. Incidentally, the monitoring camera 20*a*, 20*b* and 20*c*, for example, may be performed periodically imaging at predetermined intervals, or when the angle of the face that can be acquired is changed, re-identification information may be performed imaging when the change. As the timing at which the re-identification information changes, for example, when the re-identification information is clothes, the timing at which the user desorbs the upper attachment on which the user has worn is cited. In addition, when the re-identification information is an assignee, the timing at which the attendant changes by replacing, for example, a pair of the mother and child A, a pair of the father and child B, a pair of the mother and child B, and a pair of the father and child A, etc. can be cited.

Each of the face information and the re-identification information acquired at a plurality of locations may be stored as separate information, respectively. That is, a pair of face information and re-identification information may be stored for a common user. Specifically, for a single user, for example, the re-identification information of the garment on which the jacket is worn and the pair of face information at that time, and the re-identification information of the garment on which the jacket is detached and the pair of face information at that time may be stored as separate patterns. Further, the common user may be stored so that the newly acquired face information and re-identification information may be overwritten. That is, each time the new information is acquired, the information may be updated.

(Technical Effects)

Next, technical effects obtained by the information processing system 10 according to the fifth embodiment will be described.

As described referring to FIG. 8, in the information processing system 10 according to the fifth embodiment, face information and re-identification information are acquired and stored at a plurality of locations (for example, cameras installed at a plurality of locations). In this way, even when the face information and the re-identification information cannot be obtained by only one location, the face information and the re-identification information can be obtained at other locations. For example, face information can be acquired at one location to acquire re-identification information elsewhere. Alternatively, if the face information and the re-identification information obtained at one location are not appropriate (for example, if the face or body is hidden and the face information or the re-identification information to be acquired is insufficient), the face information and the re-identification information can be obtained again at another location.

Sixth Embodiment

An information processing system 10 according to a sixth embodiment will be described referring to FIGS. 9 and 10. Incidentally, the sixth embodiment is only different from the first to the fifth embodiments described above in a part of configuration and operation, and may be the same as the first to the fifth embodiment in other portions. Therefore, the portions that differ from the embodiments described above will be described in detail below, and the other overlapping portions will not be described as appropriate.

(Functional Configuration)

First, referring to FIG. 9, a description will be given of a functional configuration of the information processing system 10 according to the sixth embodiment. FIG. 9 is a block diagram showing the functional configuration of the information processing system according to the sixth embodiment. Incidentally, in FIG. 9, it is denoted by the same reference numerals to the same elements as the components shown in FIG. 2.

Figure 9:
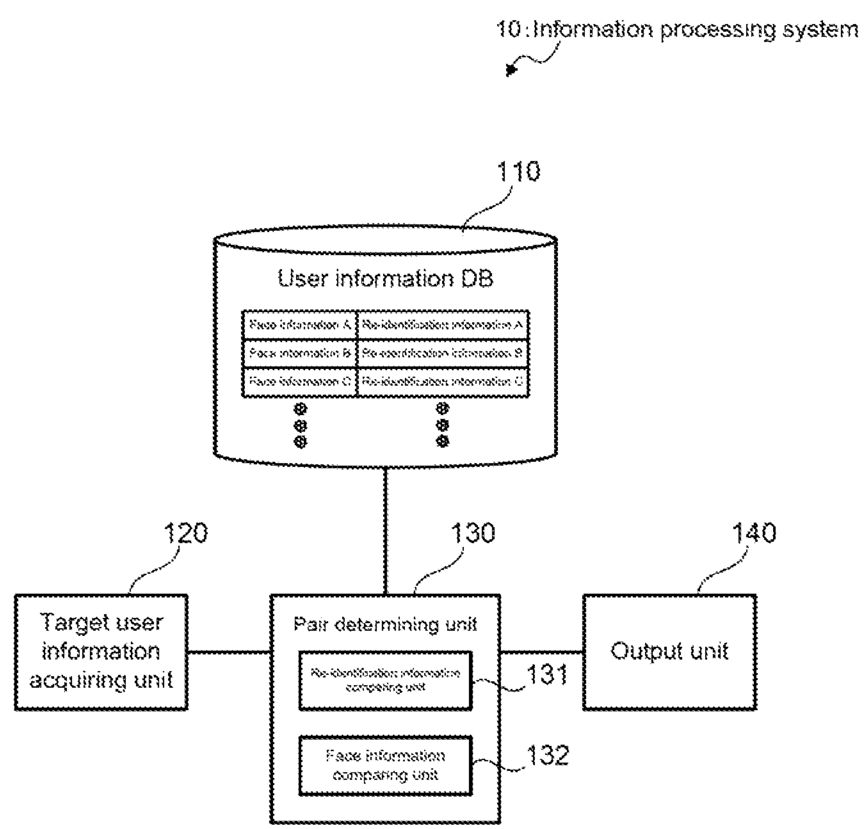
FIG. 9 is a block diagram showing a functional configuration of an information processing system according to a sixth embodiment.

As shown in FIG. 9, the information processing system 10 according to the sixth embodiment is configured to include a user information database 110, a target user information acquiring unit 120, a pair determining unit 130, and an output unit 140 as processing blocks for realizing the functions. In particular, the pair determining unit 130 according to the sixth embodiment includes a re-identification information comparing unit 131 and a face information comparing unit 132.

The re-identification information comparing unit 131 compares the re-identification information of the target user acquired by the target user information acquiring unit 120 with the re-identification information of a plurality of users stored in the user information database 110, so that the re-identification information that matches the re-identification information of the target user can be extracted from the stored re-identification information. Incidentally, the re-identification information comparing unit 131 may be configured to extract only one re-identification information (for example, only the re-identification information having the highest coincidence degree) or may be configured to extract a plurality of re-identification information (for example, all re-identification information having the coincidence degree exceeding a predetermined threshold value).

The face information comparing unit 132 is configured to be able to read out the face information stored in association with the re-identification information (that is, the re-identification information that matches the re-identification information of the target user) extracted by the re-identification information comparing unit 131 from the user information database 110. Further, the face information comparing unit is configured so as to be able to determine whether or not the face information of the target user matches the read face information by comparing the face information of the target user with the read face information. Since the face information determined by the face information comparing unit 132 is one in which the re-identification information is already determined to match by the re-identification information comparing unit 131, when it is determined that the face information matches, it can be determined that the face information and the re-identification information pair are correct pairs.

(Flow of Operation)

Next, referring to FIG. 10, flow of operation of the information processing system 10 according to the sixth embodiment will be described. FIG. 10 is a flowchart showing the flow of the operation of the information processing system according to the sixth embodiment. Incidentally, in FIG. 10, the same reference numerals are given to the same processing as shown in FIG. 3.

Figure 10:
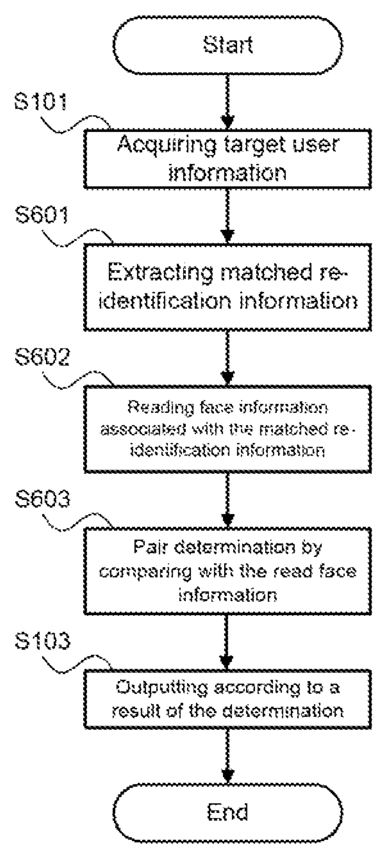
FIG. 10 is a flowchart showing flow of operation of the information processing system according to the sixth embodiment.

As shown in FIG. 10, when the information processing system 10 according to the sixth embodiment operates, first, the target user information acquiring unit 120 acquires face information and re-identification information from the target user (step S101).

Subsequently, the re-identification information comparing unit 131 extracts the re-identification information that matches the re-identification information of the target user from the re-identification information stored in the user information database 110 (step S601).

Subsequently, in Step S602, the face information comparing unit 132 reads out the face information that is stored in association with the re-identification information extracted by the re-identification information comparing unit 131. Then, the face information comparing unit 132 compares the face information of the target user with the read face information to determine whether or not the face information and the re-identification information pairs are the correct pair (step S603).

Thereafter, the output unit 140 performs output according to the determination result of the pair determining unit 130 (that is, the re-identification information comparing unit 131 and the face information comparing unit 132) (step S103).

(Technical Effects)

Next, technical effects obtained by the information processing system 10 according to the sixth embodiment will be described.

As described referring to FIGS. 9 and 10, in the information processing system 10 according to the sixth embodiment, first, it is determined whether or not the re-identification information matches, and thereafter, a match with the face information associated with the coincident re-identification information is determined. In this way, it is possible to appropriately determine whether or not the target user's face information and re-identification information are correct pairs.

Seventh Embodiment

An information processing system 10 according to a seventh embodiment will be described referring to FIG. 11. the seventh embodiment is only different from the sixth embodiment in a part of operation, may be the same as the sixth embodiment in other portions. Therefore, the portions that differ from the embodiments described above will be described in detail below, and the other overlapping portions will not be described as appropriate.

(Flow of Operation)

First, referring to FIG. 11, flow of operation of the information processing system according to the seventh embodiment will be described. FIG. 11 is a flowchart showing the flow of the operation of the information processing system according to the seventh embodiment. Incidentally, in FIG. 11, it is denoted by the same reference numerals to the same processing as shown in FIG. 10.

Figure 11:
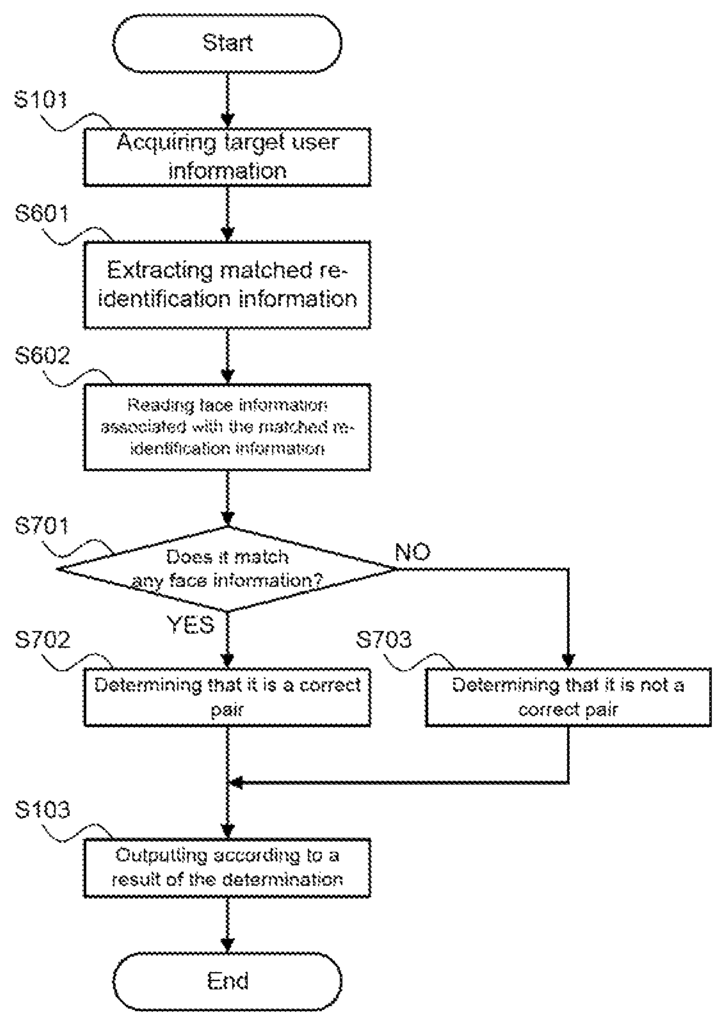
FIG. 11 is a flowchart showing flow of operation of an information processing system according to a seventh embodiment.

As shown in FIG. 11, when the information processing system 10 according to the seventh embodiment operates, first, the target user information acquiring unit 120 acquires face information and re-identification information from the target user (step S101).

Subsequently, the re-identification information comparing unit 131 extracts the re-identification information that matches the re-identification information of the target user from the re-identification information stored in the user information database 110 (step S601). Here, the re-identification information comparing unit 131 will be described as extracting a plurality of re-identification information.

Subsequently, in Step S602, the face information comparing unit 132 reads out the face information that is stored in association with the re-identification information extracted by the re-identification information comparing unit 131. That is, a plurality of facial information stored associated with each of the extracted plurality of re-identification information is read. The face information comparing unit 132 determines whether or not the face information of the target user matches any of the plurality of face information read (step S701).

Subsequently, when the face information of the target user matches any of the plurality of face information read (Step S701: YES), the face information comparing unit 132 determines that the face information and the re-identification information of the target user are the correct pair (step S702). On the other hand, when the face information of the target user does not coincide with any of the plurality of face information read (step S701: NO), the face information comparing unit 132 determines that the face information of the target user and the re-identification information are not the correct pair (step S703).

Thereafter, the output unit 140 performs output according to the determination result of the pair determining unit 130 (that is, the re-identification information comparing unit 131 and the face information comparing unit 132) (step S103). That is, the output unit 140 outputs the facial information of target person and whether or not the re-identification information is determined to be the correct pair.

(Technical Effects)

Next, technical effects obtained by the information processing system 10 according to the seventh embodiment will be described.

As described referring to FIG. 11, in the information processing system 10 according to the seventh embodiment, when there are a plurality of users with matched re-identification information, it is determined that face information and re-identification information are the correct pair if face information matches face information of any one of the plurality of users. In this way, even when there are multiple users with matching re-identification information (for example, when there are multiple users with similar re-identification information), it is possible to appropriately determine whether or not face information and re-identification information of the target user are the correct pair.

Eighth Embodiment

An information processing system 10 according to an eighth embodiment will be described referring to FIG. 12. The information processing system 10 according to the eighth embodiment is only different from the sixth embodiment described above in a part of operation, and may be the same of the sixth embodiment in other portions. Therefore, the portions that differ from the embodiments described above will be described in detail below, and the other overlapping portions will not be described as appropriate.

(Flow of Operation)

First, referring to FIG. 12, flow of operation of the information processing system according to the eighth embodiment will be described. FIG. 12 is a flowchart showing the flow of the operation of the information processing system according to the eighth embodiment. Incidentally, in FIG. 12, the same reference numerals are denoted by the same processing as shown in FIG. 10.

Figure 12:
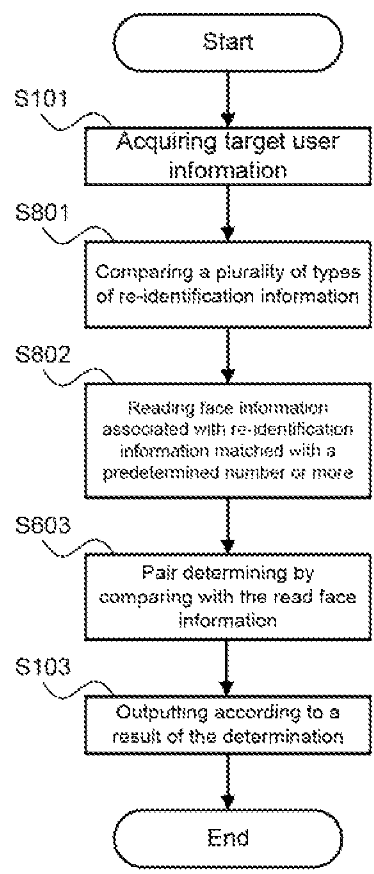
FIG. 12 is a flowchart showing flow of operation of an information processing system according to an eighth embodiment.

As shown in FIG. 12, when the information processing system 10 according to the eighth embodiment operates, first, the target user information acquiring unit 120 acquires face information and re-identification information from the target user (step S101). In the present embodiment, the re-identification information includes a plurality of types of information. For example, the re-identification information may include two or more of the various information shown in the fourth embodiment (see FIG. 7).

Subsequently, the re-identification information comparing unit 131 compares the re-identification information of the target user with the re-identification information stored in the user information database 110. Specifically, the re-identification information comparing unit 131 determines whether each of the plurality of types of information included in the re-identification information matches (step S801).

Subsequently, in Step S803, the face information comparing unit 132 reads out face information related to the re-identification information in which the predetermined number or more of information matches as a result of the comparison in the re-identification information comparing unit 131. Here, the "predetermined number" is the number that is set to determine whether the re-identification information is matched as a whole, and an appropriate value is set in advance. For example, when the predetermined number is set to three, it is determined that the re-identification information that matches three or more of the plurality of types of information matches the re-identification information of the target user, and the face information associated therewith is read out. On the other hand, for the re-identification information that matches two or less of the plurality of types of information, it is determined that the re-identification information does not match the re-identification information of the target user, and the face information associated with the re-identification information is not read.

Note that the predetermined number may be a fixed value, but may be a value that varies depending on the type of information and the like. For example, set the priority for each type of information, a predetermined number may be varied according to the priority of the information matched. Specifically, it may be determined that the re-identification information matches two or more information having a high priority, three or more information having a medium priority, and four or more information having a low priority.

Thereafter, the face information comparing unit 132 compares the face information of the target user with the read face information to determine whether or not the face information and the re-identification information pairs are correct pairs (step S603). Then, the output unit 140 performs output according to the determination result of the pair determining unit 130 (that is, the re-identification information comparing unit 131 and the face information comparing unit 132) (step S103).

(Technical Effects)

Next, technical effects obtained by the information processing system 10 according to the eighth embodiment will be described.

As described referring to FIG. 12, in the information processing system 10 according to the eighth embodiment, among the plurality of types of information included in the re-identification information, when the information of a predetermined number or more matches, it is determined that the re-identification information matches. In this way, it is possible to appropriately determine whether or not face information and re-identification information of the target user are the correct pair even if there is another user with a part of the re-identification information that matches (for example, when there are multiple users with similar re-identification information).

Display Example when Acquiring Target User Information

Figure 13:
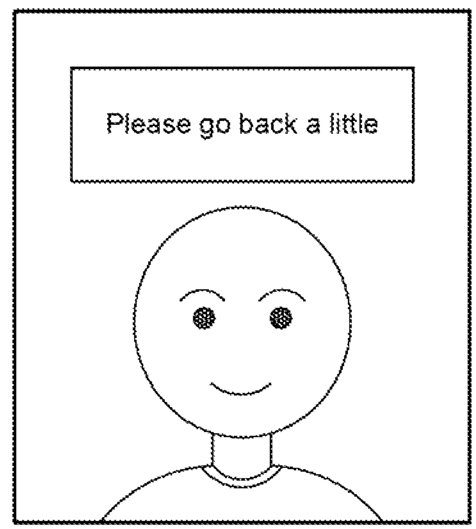
FIG. 13 is a conceptual diagram (part 1) showing a display example when acquiring information of a target user.
Figure 14:
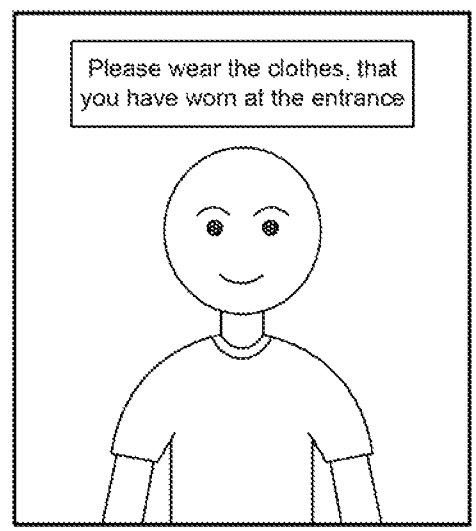
FIG. 14 is a conceptual diagram (part 2) showing a display example when acquiring information of a target user.
Figure 15:
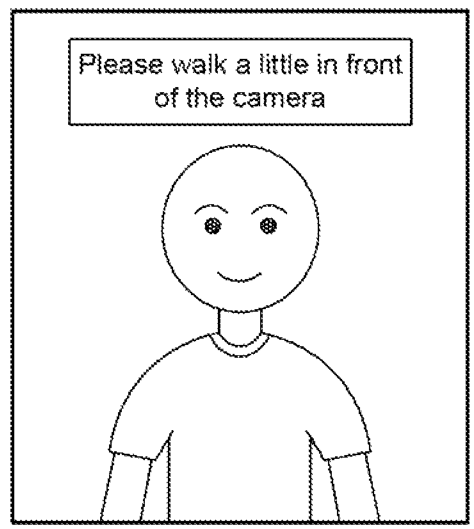
FIG. 15 is a conceptual diagram (part 3) showing a display example when acquiring information of a target user.
Figure 16:
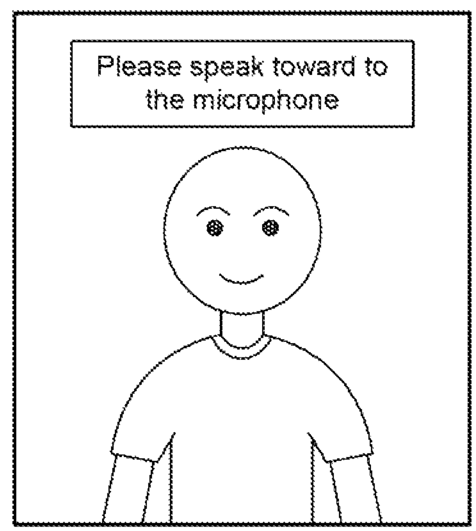
FIG. 16 is a conceptual diagram (part 4) showing a display example when acquiring information of a target user.

Next, when acquiring the information of the target user (more specifically, when the target user information acquiring unit 120 captures an image for acquiring the face information and the re-identification information of the target user), a display example to be presented to the target user will be specifically described referring to FIGS. 13 to 16. FIG. 13 is a conceptual diagram (part 1) showing a display example when acquiring the information of the target user. FIG. 14 is a conceptual diagram (part 2) showing a display example when acquiring the information of the target user. FIG. 15 is a conceptual diagram (part 3) showing a display example when acquiring the information of the target user. FIG. 16 is a conceptual diagram (part 4) showing a display example when acquiring the information of the target user.

As shown in FIG. 13, when acquiring the information of the target user, for example, a display may be performed to guide the target user's standing position such that the user's body type, clothing, gait, and property are included in the image. For example, in the example shown in FIG. 13, the target user is too close to the camera 20, the lower side than the shoulder of the target user is not imaged. Therefore, it is difficult to detect the body type, clothing, gait, and property of the coping user from the image. In such a case, a message such as "Please lower slightly behind" may be displayed to the target user. Although an example of guiding the longitudinal direction with respect to the camera to the target user here, for example, it may be performed guidance of the lateral direction and the rotational direction. Specifically, if the re-identification information is a pierce attached to the right ear, a message such as "face left" may be displayed so that the user's pierce is included in the image. In order to properly perform such guidance, the user's re-identification information and its location information may be stored in association with each other. For example, if the re-identification information is a property, it may be stored that the backpack is located on the back of the user. If the re-identification information is a garment, it may be remembered that a black down is located on the user's upper body and a blue jeans is located on the lower body.

As shown in FIG. 14, when acquiring the information of the subject user, a display for aligning the clothing may be performed, for example, so that the user's clothing matches the one at the time when it is stored. For example, in the example illustrated in FIG. 14, when the target user removes the upper and lower parts, the stored re-identification information (that is, the information on the first clothing acquired) and the current re-identification information (that is, the information on the current clothing) do not coincide with each other. In such a case, a message such as "wear clothes worn at the entrance" may be displayed to the target user.

As shown in FIG. 15, when acquiring the information of the target user, a display may be performed to instruct the target user to walk, for example, to acquire the user's walk as re-identification information. For example, in the example shown in FIG. 15, the message "Step a few steps in front of the camera and walk" is displayed to the target user. In the case where the camera is installed near the gate of the walk-through (i.e., where the target user walks through), it is also possible to omit the display of the message as described above. An example of a system with a walk-through gate includes, for example, a space for the user to walk in front of the camera, such as obtaining information from a user walking in that space.

As shown in FIG. 16, when acquiring the information of the target user, a display may be performed to instruct the target user to speak, for example, in order to acquire the voice of the user as re-identification information. For example, in the example shown in FIG. 16, a message "Please speak something toward the microphone" is displayed to the target user. If the target user is already speaking (for example, when talking with the companion), the voice may be automatically acquired and such a display may be omitted.

Incidentally, the display example described above is merely an example, in order to acquire more appropriately the information of the target user, may be performed other display according to the situation. Also, a similar notification by voice may be made in place of or in addition to such a display.

A program for operating the configuration of the forms to realize the functions of the embodiments described above is recorded on a recording medium, a program recorded on the recording medium is read as a code, and a processing method that is executed in a computer is also included in the scope of the embodiments. That is, a computer-readable recording medium is also included in range of the respective embodiments. In addition, not only the recording medium on which the above-described program is recorded, but also the program itself is included in each embodiment.

For example, a floppy (registered trademark) disk, a hard disk, an optical disk, a magnetic-optical disk, a CD-ROM, a magnetic tape, a non-volatile memory card, or a ROM can be used as a recording medium. In addition, not only the program recorded on the recording medium itself is executed by processing, but also the program that operates on the operating system and executes processing in collaboration with other software and expansion board functions is included in the scope of the respective embodiments.

The disclosure can be modified as appropriate in the claimed range and in range not contrary to the summary or philosophy of the invention which can be read from the entire specification, and information processing systems, information processing methods, and recording media with such modifications are also included in the technical philosophy of the disclosure.

<Supplementary Notes>

With respect to the embodiments described above, it may be further described as supplementary note below, but is not limited to the following.

(Supplementary Note 1)

An information processing system described in a supplementary note 1 is an information processing system comprising: a storage means for storing face information of a user and re-identification information used for re-identification of the user in association with each other; an acquiring means for acquiring the face information and the re-identification information of a target user; a determining means for performing determination whether or not the face information and the re-identification information of the target user are a pair stored in association with each other; and an output means for outputting according to a result of the determination.

(Supplementary Note 2)

An information processing system described in a supplementary note 2 is the information processing system according to the supplementary note 1, wherein the output means outputs information indicating that the target user is performing spoofing when it is determined that the face information and the re-identification information of the target user are not the pair stored in association with each other.

(Supplementary Note 3)

An information processing system described in a supplementary note 3 is the information processing system according to the supplementary note 1 or 2, wherein the information processing system further comprises a face verification means for performing face verification of the target user when it is determined that the face information and the re-identification information of the target user are the pair stored in association with each other, and the output means outputs a result of the face verification.

(Supplementary Note 4)

An information processing system described in a supplementary note 4 is the information processing system according to any one of supplementary notes 1 to 3, wherein the re-identification information includes at least one or more of follows: a body shape, clothes, a gait, a property, an attendant and voice of the user, and information obtained from a thing owned by the user.

(Supplementary Note 5)

An information processing system described in a supplementary note 5 is the information processing system according to any one of supplementary notes 1 to 4, wherein the information processing system comprises a plurality of the acquiring means, and the storage means acquires and stores the face information and the re-identification information from the acquiring means provided at a plurality of locations.

(Supplementary Note 6)

An information processing system described in a supplementary note 6 is the information processing system according to any one of supplementary notes 1 to 5, wherein the determining means performs the determination by extracting re-identification information, which matches re-identification information of the target user, from the stored re-identification information, and by determining whether or not the face information associated with the extracted re-identification information matches face information of the target user.

(Supplementary Note 7)

An information processing system described in a supplementary note 7 is the information processing system according to the supplementary note 6, wherein the determining means determines that the face information and the re-identification information are the pair stored in association with each other when the re-identification information of the target user matches the stored plurality of re-identification information, and when the face information of the target user matches any of the stored plurality of face information associated with the plurality of re-identification information.

(Supplementary Note 8)

An information processing system described in a supplementary note 8 the information processing system according to the supplementary note 6 or 7, wherein the re-identification information includes a plurality of types of information, and the determining means extracts re-identification information in which a predetermined number or more of the plurality of types of information coincide as re-identification information, which matches the re-identification information of the target user.

(Supplementary Note 9)

An information processing method described in a supplementary note 9 is an information processing method comprising: storing face information of user and re-identification information used for re-identification of the user in association with each other; acquiring the face information and the re-identification information of a target user; performing determination that whether or not the face information and the re-identification information of the target user are a pair stored in association with each other; and performing output according to a result of the determination.

(Supplementary Note 10)

A recording medium according to a supplementary note 10 a recording medium on which a computer program for causing a computer to execute an information processing method comprising: storing face information of user and re-identification information used for re-identification of the user in association with each other; acquiring the face information and the re-identification information of a target user; performing determination that whether or not the face information and the re-identification information of the target user are a pair stored in association with each other; and performing output according to a result of the determination is recorded.

(Supplementary Note 11)

A computer program described in a supplementary note 11 is a computer program for causing a computer to execute an information processing method comprising: storing face information of user and re-identification information used for re-identification of the user in association with each other; acquiring the face information and the re-identification information of a target user; performing determination that whether or not the face information and the re-identification information of the target user are a pair stored in association with each other; and performing output according to a result of the determination.

DESCRIPTION OF REFERENCE NUMERALS AND LETTERS

10 Information processing system
11 Processor
14 Storage device
16 Output device
20 Camera
110 User information database
120 Target user information acquiring unit
130 Pair determining unit
131 Re-identification information comparing unit
132 Face information comparing unit
140 Output unit
150 Face verification unit

What is claimed is:

1. An information processing system comprising:

at least one memory storing instructions; and at least one processor configured to execute the instructions to:

store a first pair consisting of face information of a user and re-identification information used for re-identification of the user in association with each other;

acquire, after acquiring the first pair, a second pair consisting of the face information and the re-identification information of a target user;

perform determination of whether or not the first pair and the second pair match by comparing the first pair with the second pair;

output information indicating that the target user is performing spoofing when having determined that the first pair and the second pair do not match; and perform face verification of the target user in a case when having determined that the first pair and the second pair match.

2. The information processing system according to claim 1, wherein the re-identification information includes at least one or more of the following a body shape, clothes, a gait, a property, an attendant and voice of the user, and information obtained from a thing owned by the user.

3. The information processing system according to claim 2, wherein the information processing system comprises a plurality of cameras, and the at least one processor is configured to execute the instructions to acquire and stores the face information and the re-identification information from the plurality of cameras provided at a plurality of locations.

4. The information processing system according to claim 2, wherein the at least one processor is configured to execute the instructions to perform the determination by extracting re-identification information, which matches the re-identification information of the target user, from the stored re-identification information, and by determining whether or not the face information associated with the extracted re-identification information matches face information of the target user.

5. The information processing system according to claim 1, wherein the information processing system comprises a plurality of cameras, and the at least one processor is configured to execute the instructions to acquire and stores the face information and the re-identification information from the plurality of cameras provided at a plurality of locations.

6. The information processing system according to claim 5, wherein the at least one processor is configured to execute the instructions to perform the determination by extracting re-identification information, which matches the re-identification information of the target user, from the stored re-identification information, and by determining whether or not the face information associated with the extracted re-identification information matches face information of the target user.

7. The information processing system according to claim 1, wherein the at least one processor is configured to execute the instructions to perform the determination by extracting re-identification information, which matches the re-identification information of the target user, from the stored re-identification information, and by determining whether or not the face information associated with the extracted re-identification information matches face information of the target user.

8. The information processing system according to claim 7, wherein the re-identification information includes a plurality of types of information, and the at least one processor is configured to execute the instructions to extract the re-identification information in which a predetermined number or more of a plurality of types of information coincide as re-identification information, which matches the re-identification information of the target user.

9. An information processing method performed by a computer and comprising:

storing a first pair consisting of face information of a user and re-identification information used for re-identification of the user in association with each other:

acquiring, after acquiring the first pair, a second pair consisting of the face information and the re-identification information of a target user:

performing determination of whether or not the first pair and the second pair match by comparing the first pair with the second pair; output information indicating that the target user is performing spoofing when having determined that the first pair and the second pair do not match; and performing face verification of the target user in a case when having determined that the first pair and the second pair match.

10. A non-transitory recording medium storing a computer program for causing executable by a computer to perform an information processing method comprising:

acquiring, after acquiring the first pair, a second pair consisting of the face information and the re-identification information of a target user:

performing determination of whether or not the first pair and the second pair match by comparing the first pair with the second pair; output information indicating that the target user is performing spoofing when having determined that the first pair and the second pair do not match; and performing face verification of the target user in a case when having determined that the first pair and the second pair match.

* * * * *